US011112059B2

(12) United States Patent
Sun et al.

(10) Patent No.: US 11,112,059 B2
(45) Date of Patent: Sep. 7, 2021

(54) ADJUSTABLE CONNECTION BETWEEN AN ASSISTIVE DEVICE AND A WEARABLE DEVICE

(71) Applicant: NEXTVPU (SHANGHAI) CO., LTD., Shanghai (CN)

(72) Inventors: Chang Sun, Shanghai (CN); Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/838,702

(22) Filed: Apr. 2, 2020

(65) Prior Publication Data
US 2021/0207766 A1    Jul. 8, 2021

Related U.S. Application Data

(63) Continuation of application No. PCT/CN2020/076148, filed on Feb. 21, 2020.

(30) Foreign Application Priority Data

Jan. 7, 2020   (CN) .......................... 202020021501.9

(51) Int. Cl.
*F16M 13/02* (2006.01)
*F16M 11/04* (2006.01)
(Continued)

(52) U.S. Cl.
CPC ........ *F16M 13/022* (2013.01); *F16M 11/041* (2013.01); *G02B 27/01* (2013.01);
(Continued)

(58) Field of Classification Search
CPC ...... F16M 13/00; F16M 13/02; F16M 13/022; F16M 11/041; G06F 1/16; G06F 1/163;
(Continued)

(56) References Cited

U.S. PATENT DOCUMENTS 4,521,831 A    6/1985 Thayer
4,527,760 A *  7/1985 Salacuse .................. A47K 1/09
                                              24/DIG. 53
(Continued)

FOREIGN PATENT DOCUMENTS

CN    1767556     *  3/2006   ............. A45C 11/00
CN    1767556 A      5/2006
(Continued)

*Primary Examiner* — Twyler L Haskins
*Assistant Examiner* — Akshay Trehan
(74) *Attorney, Agent, or Firm* — McAndrews, Held & Malloy, Ltd.

(57) ABSTRACT

The present disclosure relates to the field of wearable devices, and in particular to a connector for a wearable device, an assistive device, a wearable device, and a kit. The connector comprises a first connecting component and a second connecting component, wherein the first connecting component comprises a first engaging member, the second connecting component comprises a second engaging member, and the first connecting component and the second connecting component are connected to each other by means of the mating between the first engaging member and the second engaging member and can rotate relative to each other into a separable position and an engaged position. The connector of the present disclosure can solve the technical problem that the mounting angle of the assistive device relative to the wearable device cannot be flexibly and conveniently adjusted and cannot be maintained in each adjustment shift.

18 Claims, 6 Drawing Sheets

(51) Int. Cl.
*H04N 5/225* (2006.01)
*H04N 1/00* (2006.01)
*H04N 13/332* (2018.01)
*G03B 17/56* (2021.01)
*G02B 27/01* (2006.01)
*G06F 1/16* (2006.01)
*F16B 1/00* (2006.01)

(52) U.S. Cl.
CPC ......... *G03B 17/561* (2013.01); *G03B 17/566* (2013.01); *G06F 1/163* (2013.01); *H04N 5/2252* (2013.01); *H04N 5/2253* (2013.01); *H04N 5/2257* (2013.01); *F16B 2001/0035* (2013.01); *F16M 2200/021* (2013.01); *G02B 2027/0138* (2013.01); *H04N 1/00538* (2013.01); *H04N 13/332* (2018.05)

(58) Field of Classification Search
CPC ..... G06F 1/1605; G02B 27/01; G02B 27/017; G02B 2027/0178; G02B 2027/0138; H04N 5/2253; H04N 1/00535; H04N 1/00538; H04N 5/23209; H04N 5/2252; H04N 5/2257; H04N 13/332; G03B 17/561; G03B 17/566
USPC ........................................ 348/115; 361/679.03
See application file for complete search history.

(56) References Cited

U.S. PATENT DOCUMENTS

| | | | | |
|---|---|---|---|---|
| 7,957,765 B1* | 6/2011 | Causey | ............... | H04M 1/0256 455/556.1 |
| 8,792,041 B2* | 7/2014 | Green | ................... | G01S 17/875 348/335 |
| 9,229,299 B1* | 1/2016 | Morion | ................ | G03B 17/561 |
| 9,661,221 B2* | 5/2017 | Sadasivam | ......... | H04N 5/23216 |
| 9,678,338 B1* | 6/2017 | Bamberger | ............. | G06F 1/163 |
| 9,684,335 B2* | 6/2017 | Kim | ........................ | G06F 1/163 |
| 9,712,730 B2* | 7/2017 | Phillips | ................. | H04N 7/185 |
| 9,807,308 B2* | 10/2017 | Dietel | ................ | H04N 5/23206 |
| 9,807,492 B1* | 10/2017 | Campbell | ............... | G10L 15/25 |
| 9,864,211 B2* | 1/2018 | Belbey | ................... | H05K 13/00 |
| 9,955,108 B2* | 4/2018 | Isaac-Lowry | .......... | A42B 3/042 |
| 9,967,445 B2* | 5/2018 | Wexler | ...................... | G06F 1/18 |
| 10,084,897 B2* | 9/2018 | Sainvil | ................. | H04N 5/2253 |
| 2011/0157542 A1 | 6/2011 | Tsai | | |
| 2011/0225709 A1 | 9/2011 | Saylor et al. | | |
| 2013/0250232 A1* | 9/2013 | Belbey | ..................... | H05K 7/12 351/158 |
| 2014/0092299 A1* | 4/2014 | Phillips | .................. | F16M 11/14 348/376 |
| 2014/0204245 A1* | 7/2014 | Wexler | .................. | H04N 5/23222 348/231.99 |
| 2015/0070575 A1* | 3/2015 | Lee | ........................ | G03B 17/04 348/373 |
| 2015/0156898 A1* | 6/2015 | Shin | .................... | H04M 1/0264 361/679.02 |
| 2015/0201723 A1* | 7/2015 | Rayner | .............. | F16M 11/2021 224/191 |
| 2016/0060926 A1* | 3/2016 | Kim | ........................ | G06F 1/163 361/679.01 |
| 2016/0212869 A1* | 7/2016 | Gutschenritter | ..... | F16M 11/041 |
| 2017/0208226 A1* | 7/2017 | Zhang | .................. | H04M 1/02 |
| 2018/0077272 A1* | 3/2018 | Sainvil | ................ | H04N 5/2253 |
| 2018/0270416 A1* | 9/2018 | Kaga | .................... | H04N 5/2252 |
| 2019/0154190 A1* | 5/2019 | Yun | ...................... | F16M 11/105 |
| 2019/0339593 A1* | 11/2019 | Mayville | ................ | F16C 11/10 |
| 2020/0084902 A1* | 3/2020 | Venkatesh | .............. | F16M 11/16 |

FOREIGN PATENT DOCUMENTS

| | | | | |
|---|---|---|---|---|
| CN | 204331191 U | 5/2015 | | |
| CN | 106773040 A | 5/2017 | | |
| CN | 109751301 A | 5/2019 | | |
| CN | 209137267 U | 7/2019 | | |
| CN | 209330188 U | 8/2019 | | |
| JP | 2006127578 A | 5/2006 | | |
| JP | 2016127600 A | * | 7/2016 | ............. G03B 15/05 |
| JP | 2016127600 A | 7/2016 | | |
| KR | 20190100105 A | 8/2019 | | |
| WO | 2008080257 A1 | 7/2008 | | |
| WO | 2016032124 A1 | 3/2016 | | |
| WO | 2016117879 A1 | 7/2016 | | |

* cited by examiner

ADJUSTABLE CONNECTION BETWEEN AN ASSISTIVE DEVICE AND A WEARABLE DEVICE

CROSS-REFERENCE TO RELATED APPLICATIONS

The present application is a continuation of PCT Patent Application No. PCT/CN2020/076148, filed Feb. 21, 2020, which claims priority to Chinese Patent Application No. 202020021501.9, filed 7 Jan. 2020, entitled "A wearable device and its connector, an assistive device and a kit," the entire disclosure of which is hereby incorporated by reference.

TECHNICAL FIELD

The present disclosure relates to an assistive device and a wearable device.

BACKGROUND

A wearable device generally refers to a portable device that can be directly worn by a user or integrated with clothing or a wearing part that can be worn by the user. At present, the most common wearable devices are glasses, helmets, watches, bracelets, and headphones, etc.

Wearable devices, depending on the implementation thereof, can be generally classified into a type in which a member that performs an intelligent function is integrated into clothing or a wearing part that can be worn by a user (simply referred to as an integrated type), and a type in which a member that performs an intelligent function is attached in the form of an accessory to clothing or a wearing part (simply referred to as an assembled type). The integrated type is advantageous in terms of performance, aesthetics, user experience, etc., but has a complicated manufacturing process and high costs. Although the assembled type is not as good as the integrated type in terms of performance, aesthetics, user experience, etc., it is easy to implement and lower in cost, and facilitates matching of a member that performs an intelligent function with various wearable devices by users.

For the assembled type, the most common practice at present is to mount a small assistive device, such as a smart camera and a smart reader, which can perform an intelligent function to a wearable device (e.g. a spectacle frame without an intelligent function). The small assistive device can be detachably mounted to the wearable device by, for example, a magnetically attractable connector, wherein the connector comprises a first connecting component fixed on the assistive device and a second connecting component fixed on the wearable device. Such existing connectors usually can only fix the assistive device in a single position relative to the wearable device, i.e., it may not be possible to adjust or conveniently adjust the angle of the mounted assistive device relative to the wearable device, which significantly degrades the user experience.

For example, when an assistive device with a camera is mounted to a leg of a spectacle frame in order to recognize information captured by the camera for a user (e.g. a person visually impaired or with amblyopia), the camera needs to capture information directly in front of, above and below it while the user is walking, which requires the camera to be approximately oriented directly forward in a horizontal direction, i.e., the camera to be substantially parallel to the leg of the spectacle frame; and while the user is reading in a sitting posture, if the camera is still substantially parallel to the leg of the spectacle frame, then in order for the camera to fully recognize the required information (which requires that all the required information is located in the field of view of the camera), the user needs to keep the object to be identified (e.g. a book, etc.) in front of the camera with the help of his hand, or needs to keep his head down, which will significantly degrade the user experience. Furthermore, holding the object to be identified with a hand has a poor stability, which affects the accuracy of identification and increase the burden on the user, and requiring the user to keep his head down for a long time would also cause some damage to the user's body.

In addition, because the angle of view of the camera is vertically symmetrical, when the camera is parallel to the leg of the spectacle frame, if the identified object does not fall in an upper recognition area or a lower recognition area of the spectacle frame, the upper recognition area or the lower recognition area of the spectacle frame are meaningless and wasted, i.e., during image recognition, the utilization ratio of the field of view of the camera is not high.

Therefore, there is a need for a connector capable of conveniently and flexibly adjusting the angle of an assistive device mounted relative to a wearable device. A magnetic connector is known, which enables an assistive device to be rotatably mounted on a wearable device relative to the wearable device connector under magnetic attraction. However, when the magnetic attraction is not large enough, the connection is not firm enough; and secondly, when a user needs to rotate the assistive device relative to the wearable device by a predetermined angle for use, the assistive device connected based on magnetic attraction cannot be stably held in a certain rotation position, but may be rotated beyond the predetermined angle or stay in a position that does not reach the predetermined angle.

The methods described in this section are not necessarily the methods that have been previously conceived or employed. Unless otherwise specified, it should not be assumed that any of the methods described in this section is considered as the prior art just because it is included in this section. Similarly, unless otherwise specified, the problems mentioned in this section should not be considered to be well known in any prior art.

BRIEF SUMMARY

The present disclosure relates to a connector for mounting an assistive device to a wearable device, an assistive device comprising the connector, a wearable device comprising the connector, and a wearable device kit comprising the connector an assistive device and a wearable device.

The present disclosure provides a connector for mounting an assistive device to a wearable device, the assistive device may comprise, for example, an electronic device, such as a smart camera and an e-reader, that can be used to implement an intelligent function, and the wearable device may be a spectacle frame and the like. The connector can solve at least one of the above problems. By using the connector, the angle of the assistive device relative to the wearable device can be adjusted and optionally maintained according to the needs of the user, so as to for example adjust a recognition area of a camera of the assistive device, thereby maximizing the use of the field of view of the camera.

It should be understood that term "wearable device" used herein may be a wearable device that has an intelligent function such as image recognition, voice broadcast and the like, and may be a wearable device that has no intelligent function, such a conventional spectacle frame, a conventional helmet and the like. Connector according to the present disclosure may be coupled to the body of the wearable device (hereinafter, referred to as wearable body), and the wearable body may be a housing, a frame and the like, or a portion thereof, of the wearable device of any type that can be coupled to the assistive device.

To this end, according to a first aspect of the present disclosure, a connector for mounting an assistive device to a wearable device is provided. The connector comprises a first connecting component mounted to one of the assistive device and the wearable device, and a second connecting component mounted to the other of the assistive device and the wearable device, wherein the first connecting component comprises a first engaging member, the second connecting component comprises a second engaging member, and the first connecting component and the second connecting component are connected to each other by means of the mating between the first engaging member and the second engaging member and can rotate relative to each other into a separable position or into an engaged position; in the separable position, the first engaging member and the second engaging member are separated from each other such that the first connecting component is separably engaged with the second connecting component in an axial direction; and in the engaged position, the first engaging member and the second engaging member are engaged with each other such that the first connecting component remains inseparably engaged with the second connecting component in the axial direction, such that the assistive device is mounted to the wearable; and wherein the first connecting component is provided with a recess at the center of rotation, the first engaging member is configured as a protrusion that extends radially inward from an inner side of the recess, the second connecting component is provided with a projection at the center of rotation, and the second engaging member is configured as a lug that extends radially outward from a base of the projection. Thus, when in the engaged position, the assistive device can be relatively firmly connected to the wearable device and will not be prone to falling off when the assistive device is unintentionally touched or is shaken (for example, the assistive device bumps due to walking, running or jumping of a user when the user wears the assistive device).

In the first aspect according to the present disclosure, in some embodiments, the first connecting component further comprises at least one first holding member, and the second connecting component further comprises at least one second holding member; and the engaged position comprises at least one holding position where the first holding member and the second holding member mate with each other such that when a torque smaller than a threshold value is applied, the first connecting component and the second connecting component cannot rotate relative to each other and are held in the holding position, and only when a torque greater than or equal to the threshold value is applied, the first connecting component and the second connecting component can rotate relative to each other and out of the holding position. Here, in order to reduce the rotational frictional force, the number of the second holding members is, in some embodiments, one. Therefore, the assistive device can be selectively located in different shifts (i.e., holding positions) according to the use occasion, and can be relatively stable in the selected shift without being unintentionally rotated to another angle deviating from the predetermined angle so that the assistive device cannot be used normally.

In the first aspect according to the present disclosure, in some embodiments, the first holding member is configured as a groove, and the second holding member is configured as a raised strip; and in the holding position, the raised strip is located in the groove.

In the first aspect according to the present disclosure, in some embodiments, the first connecting component is provided with a recess at the center of rotation, and the second connecting component is provided with a projection at the center of rotation; when the second connecting component is connected to the first connecting component, at least a part of the projection is received in the recess in a form-fit manner; and the projection and the recess define an axis of rotation around which the second connecting component rotates relative to the first connecting component.

In the first aspect according to the present disclosure, in some embodiments, the projection and the recess have circular or partially circular contours matching each other.

In the first aspect according to the present disclosure, in some embodiments, the first engaging member is configured as a protrusion that extends radially inward from an inner side of the recess, and the second engaging member is configured as a lug that extends radially outward from a base of the projection; in the separable position, as viewed in the axial direction of the connector, the first engaging member and the second engaging member are disposed in a staggered manner; and in the engaged position, as viewed in the axial direction of the connector, the first engaging member and the second engaging member are engaged in an at least partially overlapped manner.

In the first aspect according to the present disclosure, in some embodiments, the protrusion has a partially circular contour matching the base of the second engaging member.

In the first aspect according to the present disclosure, in some embodiments, the first engaging member comprises a pair of protrusions provided in pairs, and the second engaging member comprises a pair of lugs provided in pairs.

In the first aspect according to the present disclosure, in some embodiments, the connector further comprises an elastic supporting member for axially supporting the second holding member in the engaged position.

In the first aspect according to the present disclosure, in some embodiments, the elastic supporting member is configured as an elastic ring disposed around the base of the projection.

In the first aspect according to the present disclosure, in some embodiments, the elastic supporting member is configured as at least one elastic bulge, on the first engaging member, extending in a direction towards the second engaging member.

In the first aspect according to the present disclosure, in some embodiments, the first connecting component has an outer peripheral surface, the second connecting component has an outer peripheral portion, the outer peripheral portion has an inner peripheral surface, the outer peripheral surface is rotatable relative to the inner peripheral surface, and the outer peripheral surface and the inner peripheral surface define an axis of rotation around which the second connecting component rotates relative to the first connecting component. When the second connecting component is connected to the first connecting component, the outer peripheral surface and the inner peripheral surface are in form-fit rotatably relative to each other.

In the first aspect according to the present disclosure, in some embodiments, the outer peripheral surface and the inner peripheral surface have any one of circular or partially circular contours matching each other, polygonal contours matching each other, and contours with teeth matching each other.

In the first aspect according to the present disclosure, in some embodiments, the first connecting component comprises at least one first magnetic component, and the second connecting component comprises at least one second magnetic component, wherein the first magnetic component and the second magnetic component are shaped and sized such that the first magnetic component and the second magnetic component can be magnetically attracted.

In the first aspect according to the present disclosure, in some embodiments, the connecting component, connected to the wearable device, in the first connecting component and the second connecting component comprises a clamping groove for clamping a part of the wearable device such that the connecting component can be detachably connected to the wearable device.

According to a second aspect of the present disclosure, a connector for mounting an assistive device to a wearable device is provided, wherein the connector comprises a first connecting component mounted to one of the assistive device and the wearable device, and a second connecting component mounted to the other of the assistive device and the wearable device, the first connecting component further comprising at least one first holding member, and the second connecting component further comprising at least one second holding member; and wherein the first connecting component and the second connecting component are connected rotatably to each other and are held in at least one holding position where the first holding member and the second holding member fit with each other such that when a torque smaller than a threshold value is applied, the first connecting component and the second connecting component cannot rotate relative to each other and are held in the holding position, and only when a torque is greater than or equal to the threshold value, the first connecting component and the second connecting component can rotate relative to each other to be out of the holding position.

In the second aspect according to the present disclosure, in some embodiments, the at least one holding position comprises a plurality of holding positions, and when the first connecting component rotates relative to the second connecting component, the first connecting component and the second connecting component are sequentially in the holding positions.

In the second aspect according to the present disclosure, in some embodiments, the first holding member is configured as a groove, and the second holding member is configured as a raised strip; and in the holding position, the raised strip is located in the groove.

According to a third aspect of the present disclosure, an assistive device is provided. The assistive device comprises the connector described above.

In the third aspect according to the present disclosure, in some embodiments, the assistive device is an electronic reader.

According to a fourth aspect of the present disclosure, a wearable device is provided. The wearable device comprises a connector described above.

In the fourth aspect according to the present disclosure, in some embodiments, the wearable device is a spectacle or a spectacle frame.

According to a fifth aspect of the present disclosure, a wearable device kit is provided. The wearable device kit comprises an assistive device and a wearable device, and further comprises the connector described above; and the assistive device comprises an electronic reader.

Figure 1:
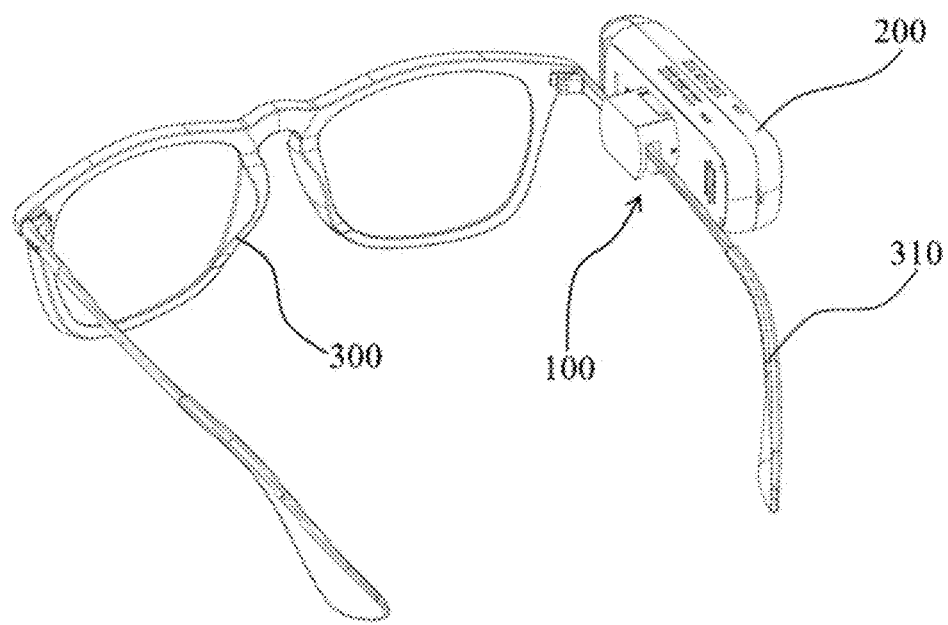
FIG. 1 is a schematic perspective view of an assistive device being connected to a spectacle frame as an example of a wearable device by means of a connector according to a preferred embodiment of the present disclosure.
Figure 2:
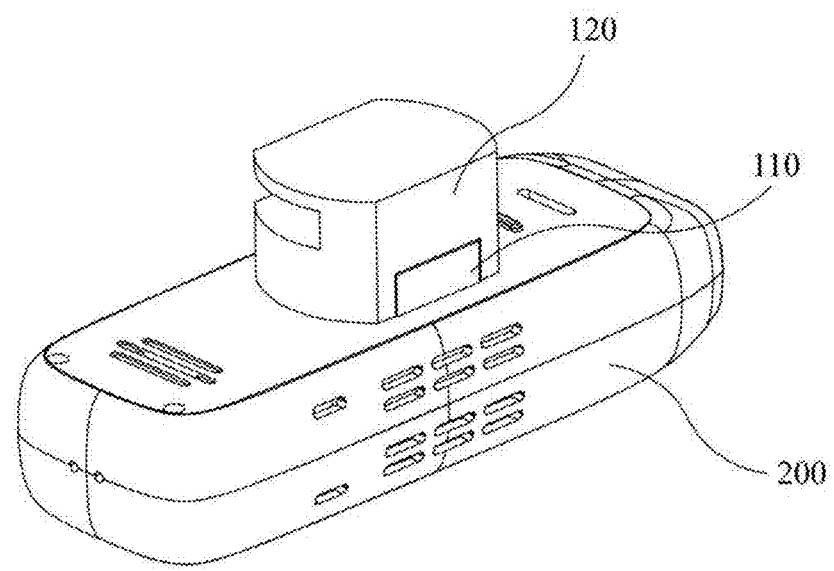
FIG. 2 is a perspective view of a connector fixed to an assistive device according to the present disclosure.
Figure 3:
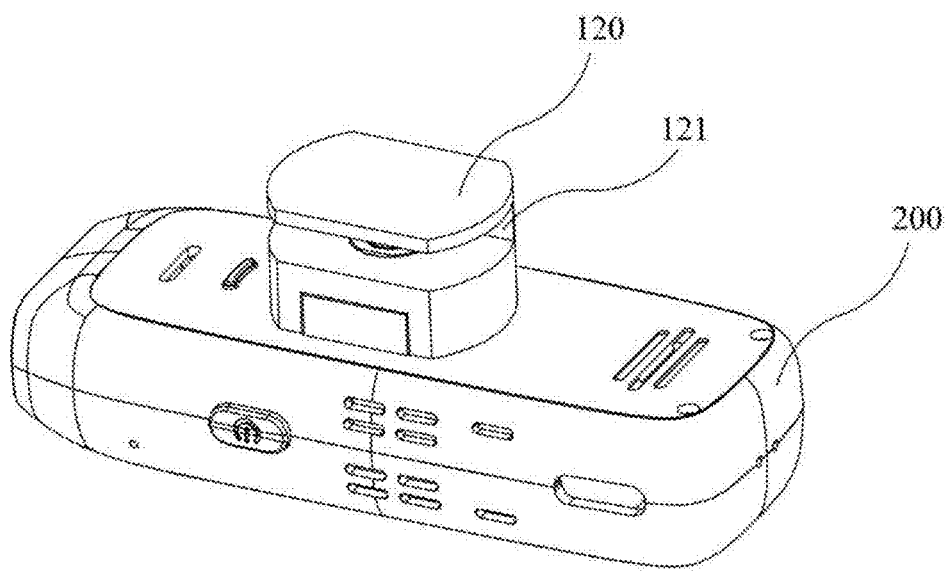
FIG. 3 is another perspective view of a connector fixed to an assistive device according to the present disclosure.
Figure 4:
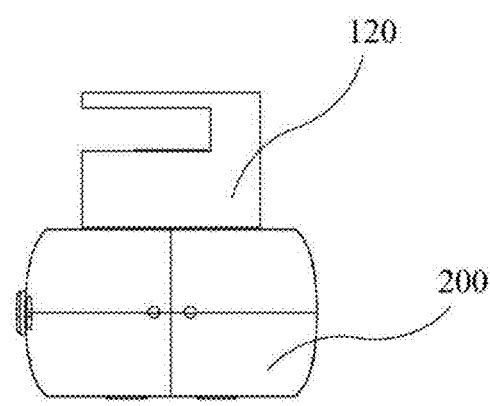
FIG. 4 is an orthographic view showing a connector is fixed to an assistive device according to the present disclosure.

The drawings exemplarily show the embodiments and constitute a part of the specification, and are used to illustrate the exemplary implementations of the embodiments together with the text description of the specification. The embodiments shown are for illustrative purposes only, but do not limit the scope of protection of the claims. Throughout the drawings, the same reference numerals refer to the same or similar elements.

DETAILED DESCRIPTION OF EMBODIMENTS

In the present disclosure, unless otherwise stated, the use of terms "first", "second", etc., to describe various elements is not intended to limit the positional relationship, temporal relationship or importance relationship of these elements, and such terms are only used to distinguish one element from another. In some examples, the first element and the second element may refer to the same example of the element, and in some cases, based on contextual descriptions, they may also refer to different examples.

The terms used in the description of the various examples in the present disclosure are merely for the purpose of describing particular examples, and are not intended to be limiting. Unless otherwise specified explicitly in the context, if the number of element is not specifically limited, this element may be one or more elements. Moreover, the term "and/or" used in the present disclosure encompasses any one of the items listed and all possible combinations.

It should be noted that although the background art and a connector used to mount a wearable device onto an assistive device are illustrated herein with a conventional spectacle frame being used as the wearable device and a smart camera/electronic reader used as the assistive device as an example, the present disclosure is not limited thereto. For example, the wearable device may be a wearable apparatus having smart functions including a smart spectacle frame, and the assistive device may be an accessory without smart functions. The connector of the present disclosure can be applicable, as long as for a wearable device and an assistive device that can be used in combination (or need to be used in combination) and need to be mounted or detached for repeated use.

A connector 100 according to a preferred embodiment of the present disclosure will be described below with reference to FIGS. 1 to 7. As shown in FIG. 1, the connector 100 is used to enable the assistive device 200 to be detachably connected to the spectacle frame 300 as a possible example of the wearable device, for example, to enable the assistive device 200 to be detachably connected a leg 310 of the spectacle frame 300. The assistive device 200 may be, for example, an electronic reader (also referred to as a smart reader), which uses computer vision and artificial intelligence technology to assistive a person visually impaired or with amblyopia for perception of the world and for a travel, and simulate human eyes to convert visual information into auditory signals, tactile signals, etc. For example, the electronic reader (also referred to as a smart reader) may be, but is not limited to, any device disclosed in the applicant's patent applications CN 106843491 A, CN 107301773 A, or CN 107307980 A, etc.

As shown in FIG. 1, the leg 310 of the spectacle frame 300 is clamped in a clamping groove 121 (a U-shaped groove herein) of the second connecting component 120, and the leg 310 can be tightly fitted in the clamping groove 121, so that the second connecting component 120 can be fastened to the leg 310 of the spectacle frame 300 without additional fastening means (e.g. adhesives, screws, etc.). It should be understood that, as another preferred implementation, the second connecting component 120 may be adhered to the leg 310 of the spectacle frame 300 by means an adhesive or the second connecting component 120 may be directly formed on the leg 310 by means of injection molding. In addition, the second connecting component 120 may be fixed to another part of the spectacle frame 300 or integrally formed therewith.

As shown in FIGS. 2 to 6C, the connector 100 according to the present disclosure comprises a first connecting component 110 and a second connecting component 120. As shown in FIG. 5B, in the preferred embodiment of the present disclosure, the first connecting component 110 and the assistive device 200 are integrated by means of injection molding, i.e., the first connecting component 110 is a part of a housing of the assistive device 200. It should be understood that the present disclosure is not limited thereto, and the first connecting component 110 may be an independent component separated from the assistive device 200 and may be fixed to the assistive device 200 by means of, for example, an adhesive, a fastener such as a screw, etc.

As an alternative embodiment, the first connecting component 110 and the second connecting component 120 may be arranged the other way around, i.e., the first connecting component 110 is connected or fixed to the spectacle frame 300 or integrally formed with a part thereof, while the second connecting component 120 is connected or fixed to the housing of the assistive device 200 or integrally formed therewith.

As shown in FIGS. 5A to 6C, the first connecting component 110 is provided with a recess 111 at the center of rotation, and the second connecting component 120 is correspondingly provided with a projection 122. Both the recess 111 and the projection 122 have a circular shape such that the second connecting component 120 can rotate relative to the first connecting component 110 when the projection 122 is received in the recess 111, i.e., the projection 122 and the recess 111 define an axis a around which the first connecting component 110 and the second connecting component 120 rotate relative to each other. It should be understood that the recess 111 and the projection 122 are not limited to having a circular contour. Specifically, the recess 111 and the projection 122 may also have contours of other shapes, e.g., partially circular contours, polygonal contours (for example, but not limited to, thirty-two, thirty-six, forty-eight polygons, etc.) or contours with multiple teeth, matching each other, with the number of sides of the polygon and the number of being able to be set according to the requirements of the range of adjustment and the minimum angle of adjustment required by specific application scenarios.

Figure 5A:
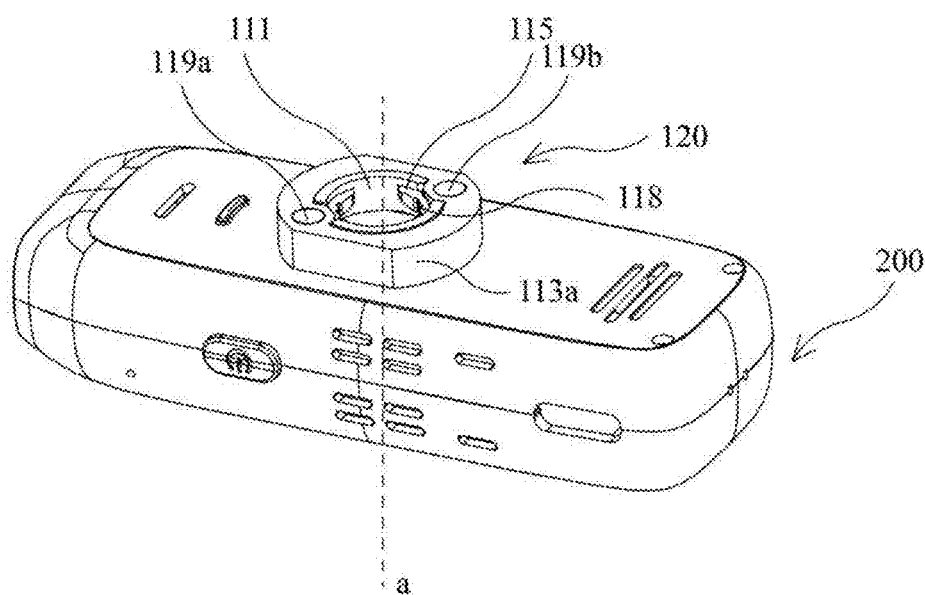
FIG. 5A is a perspective view of a first connecting component fixed to an assistive device according to the present disclosure.
Figure 5B:
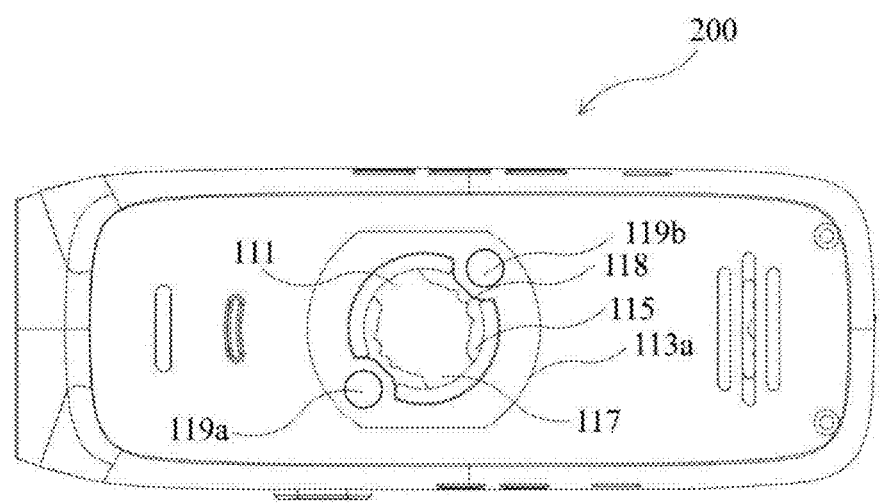
FIG. 5B is a top view of a first connecting component according to the present disclosure.
Figure 6A:
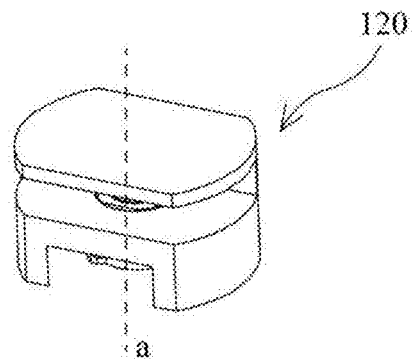
FIG. 6A and FIG. 6B are perspective views at different perspectives of a second connecting component according to the present disclosure.
Figure 6B:
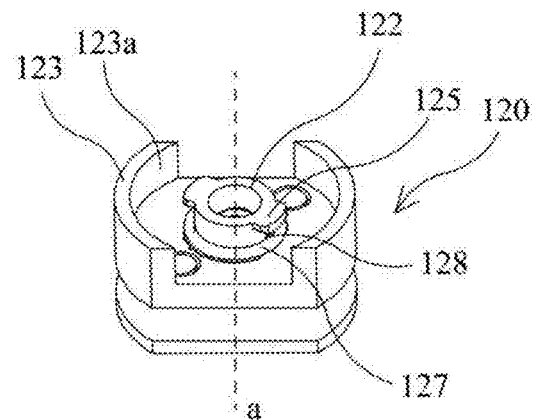
Figure 6C:
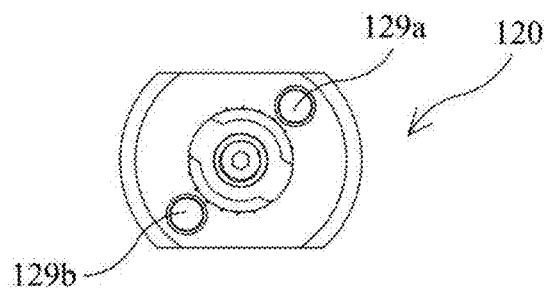
FIG. 6C is a top view of a second connecting component according to the present disclosure.

As shown in FIGS. 5A and 5B, the first connecting component 110 comprises a first engaging member 115. In the preferred embodiment, the first engaging member 115 is configured as two protrusions extending radially inward from the inner side of the recess 111, with the inner diameter of the protrusions being larger than, and preferably slightly larger than the outer diameter of the projection 122 of the second connecting component. As shown in FIGS. 6A to 6C, the second connecting component 120 comprises a second engaging member 125, the second engaging member 125 is configured as two lugs extending radially outward from a base (in some embodiments, in the form of a cylinder) of the projection 122, the lugs have a partially circular contour that fit with the recess 111 of the second engaging member, and the outer diameter of the lugs should be larger than the inner diameter of the protrusions and smaller than, in some embodiments, slightly smaller than or equal to the inner diameter of the recess 111. It should be understood that the first engaging member 115 and the second engaging member 125 may be respectively a part integrally formed to the recess 111 and the projection 122, or may be independent components separated from the recess 111 and the projection 122 and be fixed on the recess and the projection by means of various fastening means (e.g. adhesives, screws, etc.). Moreover, the first engaging member 115 may comprises only one, two, three or more protrusions. These protrusions are preferably evenly and symmetrically distributed around the circumference of the recess 111, with at least one gap 117 being left in the circumference of the recess 111 for the second engaging member 125 to pass through and engage with the first engaging member 115. Likewise, the second engaging member 125 may also be provided with only one, two, three or more lugs. These lugs are preferably evenly and symmetrically distributed around the circumference of the second connecting component, and the circumferential width of the lugs is set such that the lugs can pass through the gap 117 in the axial direction.

Based on the first engagement member 115 and the second engagement member 125, the connector comprises a separable position and an engaged position.

When the first connecting component 110 and the second connecting component 120 rotate relative to each other into a position where the second engaging member 125 can pass through the gap 117 in the direction of the axis a of the connector and reach a position below the first engaging member 115 (see FIG. 5A), the first connecting component 110 and the second connecting component 120 are in the separable position. In the separable position, as viewed in the direction of the axis a, the first engaging member 115 and the second engaging member 125 are not overlapped, i.e., arranged in a staggered manner, so that the first connecting component 110 is separable relative to the second connecting component 120 in the axial direction.

When the first connecting component 110 and the second connecting component 120 rotate relative to each other into a position where the second engaging member 125 cannot pass through the gap 117 in the direction of the axis a of the connector due to the stop of the first engaging member 115, the first connecting component 110 and the second connecting component 120 are in the engaged position. In the engaged position, as viewed in the direction of the axis a, the first engaging member 115 and the second engaging member 125 are at least partially overlapped, and preferably the second engaging member 125 is completely covered by the first engaging member 115. At this time, the first engaging member 115 has an axial stop effect against the second engaging member 125, so that the second engaging member 125 is always maintained below the first engaging member 115 and cannot axially move to a position above the first engaging member (referring to FIG. 5A). As a result, the first connecting component 110 remains inseparably engaged with the second connecting component 120 in the axial direction.

When the assistive device is mounted on the wearable device, the user firstly makes the first connecting component 110 and the second connecting component 120 be axially aligned and be able to rotate relative to each other (if the second connecting component 120 is fixed on the wearable device, the first connecting component 110 is rotated; and if the first connecting component 110 is fixed on the wearable device, the second connecting component 120 is rotated) until the connecting components reach the separable position. In the separable position, the first connecting component 110 and the second connecting component axially move close to each other so that the second engaging member 125 passes through the gap, i.e., through the plane where the first engaging member 115 is located. The first connecting component 110 (or the second connecting component 120) is further rotated until it reaches the engaged position. As a result, the assistive device is rotatably mounted on the wearable device.

In the preferred embodiment of the present disclosure described above, in order to enable the assistive device to be relatively firmly held on the wearable device without being randomly rotated into an undesired position relative to the wearable device due to interference (e.g. bumps caused by walking of the user or unintentional touches by the user), the engaged position further comprises at least one holding position, for example, three rotation shifts.

As can be seen from FIGS. 5A to 6D, in one preferred embodiment, two first engaging members 115 are circumferentially symmetrically provided in the recess 111 of the first connecting component 110, and each of the first engaging members 115 is provided with three grooves (first holding members 118) penetrating the first engaging member 115. On the projection 122 of the second connecting component, two second holding members 128 (see FIG. 6D) in the form of raised strips are symmetrically provided. It should be understood that, according to the needs of the rotation shift, the number of the first holding member 118 and the second holding member 128 can be any number and may be different from the above embodiment, for example, one, two, three or more first holding members may also be provided on a single first engaging member 115. Here, it is advantageous to provide a single second holding member 128, so that excessive frictional forces can be avoided during relative rotation. The number of the first holding members 118 is the number of rotation shifts. In the holding position, the second holding member 128 may be located in one of the first holding members 118, i.e., the raised strip is in form-fit with one of the grooves. When the torque applied to the connector is less than a threshold value (the threshold value is approximately determined by the material and sizes of the first and second holding members), the form-fit enables the first connecting component 110 and the second connecting component 120 to be held in the holding position while they cannot be rotated relative to each other, i.e., the connector is held in the current rotation shift. When the torque applied to the connector is greater than or equal to the threshold value, the resistance generated by the form-fit is overcome due to the deformation (e.g. elastic deformation) of one or both of the first holding member 118 and the second holding member 128, and the raised strip slides out of the corresponding groove, so that the first connecting component 110 and the second connecting component 120 can further rotate relative to each other to be out of the holding position. At this time, if the first connecting component 110 further rotates relative to the second connecting component 120, when the raised strip enters the next groove, the connector will be into the next holding position, i.e., into the next rotation shift. As described above, when a torque greater than the threshold value is applied, the connector will be out of the next rotation shift. Similarly, when the second connecting component 120 is rotated relative to the first connecting component 110 in one direction, the connector will sequentially pass all the rotation shifts in the engaged position until the connector reaches the separable position. Of course, the user can also rotate the connector in the opposite direction to remove the assistive device more quickly and easily. For example, after reaching the first holding position in a first rotation direction, if the user wants to remove the assistive device from the wearable device at this time, the connector can be rotated in a second rotation direction opposite the first rotation direction, so that the connector can quickly reach the separable position without necessarily passing the connector through the holding positions in turn.

It should be understood here that according to the preferred embodiments of the present disclosure described above, both the mating between the first engaging member 115 and the second engaging member 125 and the mating between the first holding member 118 and the second holding member 128 achieve that the first connecting component 110 and the second connecting component 120 are held in one or more positions (engaged positions or holding positions) which are not rotatable relative to each other. It should be understood by those skilled in the art that the present disclosure is not limited thereto, and those skilled in the art may also selectively configure one or two of the combination of the first engaging member 115 and the second engaging member 125 and the combination of the first holding member 118 and the second holding member 128.

Figure 6D:
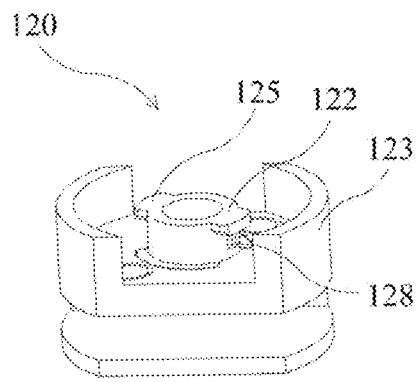
FIG. 6D is a perspective view of a second connecting component according to the present disclosure.
Figure 7:
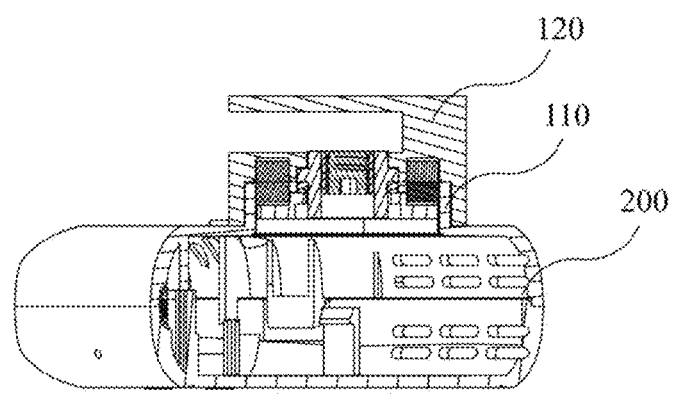
FIG. 7 is a cross-sectional view of the assistive device in a lengthwise direction, showing the mating state of the components when the connector is fixed to the assistive device.
Figure 8:
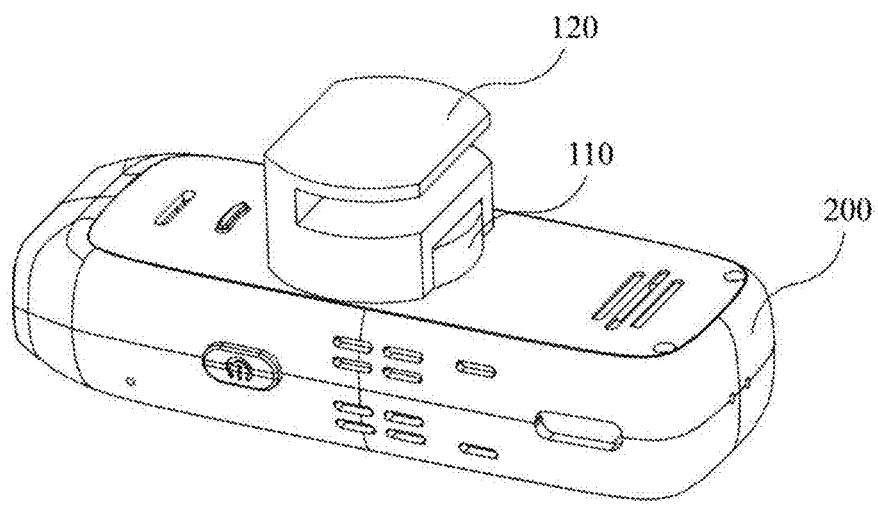
FIG. 8 shows one rotational position of a connector according to the present disclosure.

As shown in FIG. 6B, an elastic ring 127 is provided in the circumference of the projection 122 of the second connecting component 120, and the elastic ring can be made of an elastic material such as rubber or silicone. In the engaged position, the elastic ring 127 axially supports the second holding member 128 so that the second connecting component 120 is axially fixed relative to the first connecting component 110. The elastic ring additionally prevents the abrasion between the second connecting component 120 and the first connecting component 110. Otherwise, without the elastic ring mounted, the relative rotation between the first connecting component 110 and the second connecting component 120 required for the assembly and disassembly of the assistive device causes direct friction on their contact surfaces, which further causes the axial wear of the first connecting component 110 and/or the second connecting component 120 and the clearance between axial mating parts thereof. As an alternative to the elastic ring 127, the first engaging member 115 may also be provided with at least one elastic bulge (not shown) as an elastic supporting member for axially supporting the second holding member in the engaged position. In the engaged position, the at least one elastic bulge extends in a direction towards the second engaging member 125 to abut against the second engaging member 125. It should be understood that the elastic ring 127 or the elastic bulge is not necessary. For example, when the axial dimension of the recess 111 below the first engaging member 115 is consistent with the axial dimension of the second engaging member, the elastic ring 127 or the elastic bulge can be omitted, as shown in FIG. 6D.

In the preferred embodiment of the present disclosure described above, as shown in FIGS. 5A and 6B, the first connecting component 110 has an outer peripheral surface 113a, and the second connecting component 120 comprises an outer peripheral portion 123 having an inner peripheral surface 123a, the outer peripheral surface 113a and the inner peripheral surface 123a are shown as partially circular contours in form-fit with each other and define the axis a around which the first connecting component 110 and the second connecting component 120 rotate relative to each other. It should be understood that the inner peripheral surface 123a of the outer peripheral portion 123 of the second connecting component 120 and the outer peripheral surface 113a of the first connecting component 110 are not limited to the partially circular contours shown in the figure, but may be polygonal contours or contours with multiple teeth, matching each other, with the number of sides of the polygon and the number of teeth being set according to the requirements of the range of adjustment and the minimum angle of adjustment required by specific application scenarios.

As shown in FIGS. 5A, 5B, 6B, and 6C, the first connecting component 110 further comprises first magnetic components (first permanent magnets 119a and 119b), and the second connecting component 120 further comprises second magnetic components (second permanent magnets 129a and 129b) that can be magnetically attracted to the first magnetic components. In one preferred embodiment of the present disclosure, the first permanent magnets 119a, 119b have opposite polarities, and the second permanent magnets 129a, 129b have opposite polarities. As one example, the first permanent magnet 119a and the second permanent magnet 129b are S-pole magnets, and the first permanent magnet 119b and the second permanent magnet 129a are N-pole magnets. When the assistive device 200 approaches the second connecting component 120 in a correct direction, the first permanent magnet 119a (S-pole magnet) is aligned with the second permanent magnet 129a (N-pole magnet), and the first permanent magnet 119b (N-pole magnet) is aligned with the second permanent magnet 129b (S-pole magnet), so that the first connection component 110 and the second connecting component 120 can be magnetically attracted to each other. However, when the assistive device 200 is mounted to the second connecting component 120 in a wrong direction (for example, rotated by 180 degrees relative to the correct direction), the first permanent magnet 119a (S-pole magnet) is aligned with the second permanent magnet 129b (S-pole magnet), and the first permanent magnet 119b (N-pole magnet) is aligned with the second permanent magnet 129a (N-pole magnet), so that the first connecting component 110 and the second connecting component 120 will repel each other so as to reminder the user that the mounting direction is wrong, which is very beneficial for a person visually impaired or with amblyopia. In one preferred embodiment of the present disclosure, the positions of the first permanent magnets 119a, 119b and the second permanent magnets 129a, 129b are set such that when the first permanent magnet is aligned with the second permanent magnet, the connector is located in the separable position. Here, by using the magnetic attraction effect, the second connecting component 120 axially approaches the first connecting component 110, and the lug can just pass through the gap 117 to reach a position below the recess 111. At this time, the magnetic attraction between the magnets can also help the user to easily connect the two connecting components without having to precisely align the two connecting components, and then the user can rotate the assistive device by a certain angle relative to the wearable device according to the needs to fix the assistive device in the corresponding rotation shift, which is also very beneficial for a person visually impaired or with amblyopia.

The method of using the connector 100 according to the present disclosure is not limited to the methods shown in the drawings, i.e., the first connecting component 110 is integrated with the assistive device 200, and the second connecting component 120 is detachably mounted to the spectacle frame 300.

For example, the connector 100 according to the present disclosure may be sold independently from the assistive device 200 which needs to be mounted and the spectacle frame 300. After a user purchases the connector 100, the first connecting component 110 is fixed to one of the assistive device 200 and the spectacle frame 300, and the second connecting component 120 is fixed to the other of the assistive device 200 and the spectacle frame 300 by means of an adhesive or a fastener such as a screw or a bolt, etc. As a result, the assistive device 200 can be connected to the spectacle frame 300 in a flexible and reliable manner, for example, the assistive device can be connected to the existing common spectacle of the user to implement various intelligent functions, and at the same time it is also possible to prevent the assistive device 200 from being mounted to the spectacle frame in a wrong orientation.

In addition, in the preferred embodiment of the present disclosure described above, the form-fit between the recess 111 and the projection 122, the form-fit between the inner peripheral surface 123a of the outer peripheral portion 123 of the second connecting component 120 and the outer peripheral surface 113a of the first connecting component 110, and the form-fit between the first holding member 118 and the second holding member 128 all define an axis of rotation around which the first connecting component 110 and the second connecting component 120 rotate relative to each other and enable the first connecting component 110 and the second connecting component 120 to rotate relative to each other by a predetermined angle. Those skilled in the art should understand that the present disclosure is not limited thereto, and those skilled in the art would also be able to selectively configure, according to the needs of the actual application scenarios, any one or a combination of any two of the following three combinations: the combination of the recess 111 and the projection 122, the combination of the inner peripheral surface 123a and the outer peripheral surface 113a, and the combination of the first holding member 118 and the second holding member 128.

Although the embodiments or examples of the present disclosure have been described with reference to the drawings, it should be understood that the methods, systems and devices described above are merely exemplary embodiments or examples, and the scope of the present disclosure is not limited by the embodiments or examples, and is only defined by the scope of the granted claims and the equivalents thereof. Various elements in the embodiments or examples can be omitted or substituted by equivalent elements thereof. Moreover, the steps can be performed in an order different from that described in the present disclosure. Further, various elements in the embodiments or examples can be combined in various ways. It is important that, as the technology evolves, many elements described herein can be substituted by equivalent elements that appear after the present disclosure.

What is claimed is:

1. An assistive device comprising a connector for mounting the assistive device to a wearable body, wherein the connector includes: a first connecting component to be mounted to one of the assistive device and the wearable body, and a second connecting component to be mounted to the other of the assistive device and the wearable body,
wherein the first connecting component comprises a first engaging member, the second connecting component comprises a second engaging member, and the first connecting component and the second connecting component are configured to rotate relative to each other into a separable position or into an engaged position,
wherein in the separable position, the first engaging member and the second engaging member are separated from each other such that the first connecting component is separably engaged with the second connecting component in an axial direction,
wherein in the engaged position, the first engaging member and the second engaging member are engaged with each other such that the first connecting component is inseparably engaged with the second connecting component in the axial direction,
wherein the first connecting component further comprises at least one first holding member, the second connecting component further comprises at least one second holding member, and the engaged position comprises at least one rotation position where the first connecting component is rotatable relative to the second connecting component around the axial direction, and a plurality of holding positions where the first holding member and the second holding member mate with each other such that when a torque smaller than a threshold value is applied, the first connecting component and the second connecting component are not rotatable relative to each other and are held in one of the plurality of holding positions, and when a torque greater than or equal to the threshold value is applied, the first connecting component and the second connecting component are rotatable relative to each other to be out of the one of the plurality of holding positions; and
wherein the first connecting component has an outer peripheral surface, the second connecting component has an outer peripheral portion, the outer peripheral portion has an inner peripheral surface, the outer peripheral surface is rotatable relative to the inner peripheral surface, and the outer peripheral surface and the inner peripheral surface define an axis of rotation around which the second connecting component rotates relative to the first connecting component, wherein the first holding member is configured as grooves, and the second holding member is configured as a raised strip and in the holding position, the raised strip is located in one of the grooves.

2. The assistive device according to claim 1, wherein
the first connecting component is provided with a recess at the center of rotation, and the second connecting component is provided with a projection at the center of rotation;
when the second connecting component is connected with the first connecting component, at least a part of the projection is received in the recess in a form-fit manner; and
the projection and the recess define an axis of rotation around which the second connecting component rotates relative to the first connecting component.

3. The assistive device according to claim 2, wherein
the projection and the recess have circular or partially circular contours matching each other.

4. The assistive device according to claim 2, wherein
the first engaging member is configured as a protrusion that extends radially inward from an inner side of the recess, and the second engaging member is configured as a lug that extends radially outward from a base of the projection;
in the separable position, as viewed in the axial direction of the connector, the first engaging member and the second engaging member are disposed in a staggered manner, and
in the engaged position, as viewed in the axial direction of the connector, the first engaging member and the second engaging member are engaged in an at least partially overlapped manner.

5. The assistive device according to claim 4, wherein
the protrusion has a partially circular contour matching the base of the second engaging member.

6. The assistive device according to claim 4, wherein
the first engaging member comprises a pair of protrusions provided in pairs, and the second engaging member comprises a pair of lugs provided in pairs.

7. The assistive device according to claim 4, wherein
the connector further comprises an elastic supporting member for axially supporting the second holding member in the engaged position.

8. The assistive device according to claim 7, wherein
the elastic supporting member is configured as an elastic ring disposed around the base of the projection.

9. The assistive device according to claim 7, wherein
the elastic supporting member is configured as at least one elastic bulge on the first engaging member extending in a direction towards the second engaging member.

10. The assistive device according to claim 1, wherein
when the second connecting component is connected with the first connecting component, the outer peripheral surface and the inner peripheral surface are in form-fit rotatably relative to each other.

11. The assistive device according to claim 10, wherein
the outer peripheral surface and the inner peripheral surface have any one of circular or partially circular contours matching each other, polygonal contours matching each other, and contours with teeth matching each other.

12. The assistive device according to claim 1, wherein
the first connecting component comprises at least one first magnetic component, and the second connecting component comprises at least one second magnetic component, wherein the first magnetic component and the second magnetic component are shaped and sized such that the first magnetic component and the second magnetic component are configured to magnetically attracted.

13. The assistive device according to claim 1, wherein the connecting components, connected to the wearable body, of the first connecting component and the second connecting component comprise a clamping groove for clamping a part of the wearable body such that the connecting components are configured to detachably connected to the wearable body.

14. The assistive device according to claim 1, comprising an electronic reader.

15. The assistive device according to claim 1, wherein the first connecting component comprises at least one first magnetic component, and the second connecting component comprises at least one second magnetic component, wherein the first magnetic component and the second magnetic component are arranged to repel each other in a wrong mounting direction of the assistive device onto the wearable body.

16. An assistive device comprising a connector for mounting the assistive device to a wearable body, wherein the connector includes: a first connecting component to be mounted to one of the assistive device and the wearable body, and a second connecting component to be mounted to the other of the assistive device and the wearable body, the first connecting component further comprising at least one first holding member, and the second connecting component further comprising at least one second holding member, wherein the first connecting component and the second connecting component are connected to be non-rotatable with respect to each other in a plurality of holding positions and rotatable with respect to each other in other positions than the plurality of holding positions, wherein in the plurality of holding positions, the first holding member and the second holding member fit with each other such that when a torque smaller than a threshold value is applied, the first connecting component and the second connecting component are non-rotatably held relative to each other, and when a torque applied is greater than or equal to the threshold value, the first connecting component and the second connecting component are rotatable relative to each other to be out of the plurality of holding positions; and wherein the first connecting component has an outer peripheral surface, the second connecting component has an outer peripheral portion, the outer peripheral portion has an inner peripheral surface, the outer peripheral surface is rotatable relative to the inner peripheral surface, and the outer peripheral surface and the inner peripheral surface define an axis of rotation around which the second connecting component rotates relative to the first connecting component, wherein the first holding member is configured as grooves, and the second holding member is configured as a raised strip and in the holding position, the raised strip is located in one of the grooves.

17. The assistive device according to claim 16, wherein the at least one holding position comprises a plurality of holding positions, and when the first connecting component rotates relative to the second connecting component, the first connecting component and the second connecting component are in the holding positions sequentially.

18. A wearable device, comprising:
a wearable body;
an assistive device; and
a connector for coupling the assistive device to the wearable body;
wherein the connector includes: a first connecting component to be mounted to one of the assistive device and the wearable body, and a second connecting component to be mounted to the other of the assistive device and the wearable body,
wherein the first connecting component comprises a first engaging member, the second connecting component comprises a second engaging member, and the first connecting component and the second connecting component are configured to rotate relative to each other into a separable position or into an engaged position,
wherein in the separable position, the first engaging member and the second engaging member are separated from each other such that the first connecting component is separably engaged with the second connecting component in an axial direction,
wherein in the engaged position, the first engaging member and the second engaging member are engaged with each other such that the first connecting component is inseparably engaged with the second connecting component in the axial direction,
wherein the first connecting component further comprises at least one first holding member, the second connecting component further comprises at least one second holding member, and the engaged position comprises at least one rotation position where the first connecting component is rotatable relative to the second connecting component around the axial direction, and a plurality of holding positions where the first holding member and the second holding member mate with each other such that when a torque smaller than a threshold value is applied, the first connecting component and the second connecting component are not rotatable relative to each other and are held in one of the plurality of holding positions, and when a torque greater than or equal to the threshold value is applied, the first connecting component and the second connecting component are rotatable relative to each other to be out of the one of the plurality of holding positions; and
wherein the first connecting component has an outer peripheral surface, the second connecting component has an outer peripheral portion, the outer peripheral portion has an inner peripheral surface, the outer peripheral surface is rotatable relative to the inner peripheral surface, and the outer peripheral surface and the inner peripheral surface define an axis of rotation around which the second connecting component rotates relative to the first connecting component, wherein the first holding member is configured as grooves, and the second holding member is configured as a raised strip and in the holding position, the raised strip is located in one of the grooves.

* * * * *